US008080127B2

(12) United States Patent
Chen

(10) Patent No.: US 8,080,127 B2
(45) Date of Patent: Dec. 20, 2011

(54) CARBON FOAM EVAPORATOR

(75) Inventor: Chong Chen, Broadview Heights, OH (US)

(73) Assignee: GrafTech International Holdings Inc., Parma, OH (US)

( * ) Notice: Subject to any disclaimer, the term of this patent is extended or adjusted under 35 U.S.C. 154(b) by 1067 days.

(21) Appl. No.: 11/735,487

(22) Filed: Apr. 15, 2007

(65) Prior Publication Data
US 2008/0251215 A1    Oct. 16, 2008

(51) Int. Cl.
*B01D 1/14* (2006.01)
*B01D 1/30* (2006.01)
*B01F 3/04* (2006.01)
*B32B 3/26* (2006.01)
*C01B 31/02* (2006.01)

(52) U.S. Cl. ............ 159/16.1; 159/47.1; 159/DIG. 4; 159/DIG. 15; 261/72.1; 261/75; 261/95; 261/DIG. 26; 423/460; 423/461; 428/304.4; 428/314.8; 428/315.5; 428/315.7; 428/408

(58) Field of Classification Search .............. 159/16.1, 159/47.1, DIG. 4, DIG. 15; 202/267.1; 203/49, 203/86; 261/72.1, 75, 95, 154, DIG. 26; 428/304.4, 312.2, 315.7, 314.8, 315.5, 408; 423/445 R, 448, 460, 461; 165/60, 905
See application file for complete search history.

(56) References Cited

U.S. PATENT DOCUMENTS

| | | | |
|---|---|---|---|
| 3,302,399 A | 2/1967 | Tini et al. | 60/39.7 |
| 3,302,909 A | 2/1967 | Glassman | 248/44 |
| 3,309,437 A | 3/1967 | Harnett | 264/29 |
| 3,387,940 A | 6/1968 | McHenry et al. | 23/209.2 |
| 3,632,385 A | 1/1972 | Schmitt et al. | 117/46 |
| RE28,574 E | 10/1975 | Ruoff | 425/78 |
| 3,960,761 A | 6/1976 | Burger et al. | 252/421 |
| 4,190,637 A | 2/1980 | Kennedy | 423/448 |
| 4,296,082 A * | 10/1981 | Lowe et al. | 423/305 |
| 4,619,796 A | 10/1986 | Awata et al. | 264/29.4 |
| 4,681,718 A | 7/1987 | Oldham | 264/102 |
| 4,851,280 A | 7/1989 | Gupta | 428/246 |
| 4,879,182 A | 11/1989 | Presswood et al. | 428/408 |
| 4,985,118 A * | 1/1991 | Kurematsu et al. | 159/47.3 |
| 4,992,254 A | 2/1991 | Kong | 423/449 |
| 5,047,225 A | 9/1991 | Kong | 423/447.2 |
| 5,211,786 A | 5/1993 | Enloe et al. | 156/89 |
| 5,282,734 A | 2/1994 | Pastureau et al. | 425/393 |
| 5,303,768 A | 4/1994 | Alario et al. | 165/104 |

(Continued)

FOREIGN PATENT DOCUMENTS

WO    WO 2006/076556    7/2006

OTHER PUBLICATIONS

Tom Sephton, Multiple Effect Seawater Evaporator flow diagram, http://www.funhousefilms.com/techncpg.htm, 1996.

(Continued)

*Primary Examiner* — Virginia Manoharan
(74) *Attorney, Agent, or Firm* — Waddey & Patterson, P.C.; James R. Cartiglia

(57) ABSTRACT

A carbon foam evaporator is described which can be used in a wide variety of operating conditions. The evaporator utilizes a carbon foam with a bi-model pore distribution. The carbon foam is thermally stable up to temperatures of at least 300° C., is rigid, and has a compressive strength of at least 100 psi. The carbon foam is also resistant to chemical attacks.

21 Claims, 3 Drawing Sheets

U.S. PATENT DOCUMENTS

| | | | | |
|---|---|---|---|---|
| 5,358,802 | A | 10/1994 | Mayer et al. | 429/218 |
| 5,419,810 | A * | 5/1995 | Van Der Piepen et al. | 159/6.2 |
| 5,648,027 | A | 7/1997 | Tajiri et al. | 264/43 |
| 5,671,322 | A * | 9/1997 | Finicle | 392/389 |
| 5,686,038 | A | 11/1997 | Christensen et al. | 264/257 |
| 5,709,893 | A | 1/1998 | McCarville et al. | 425/389 |
| 5,730,915 | A | 3/1998 | Cornie | 264/29.1 |
| 5,868,974 | A | 2/1999 | Kearns | 264/29.6 |
| 5,888,469 | A | 3/1999 | Stiller et al. | 423/445 |
| 5,937,932 | A | 8/1999 | Cornie | 164/526 |
| 5,945,084 | A | 8/1999 | Droege | 423/447.4 |
| 5,961,814 | A | 10/1999 | Kearns | 208/39 |
| 5,984,256 | A | 11/1999 | Endo | 249/114.1 |
| 6,024,555 | A | 2/2000 | Goodridge et al. | 425/394 |
| 6,033,506 | A | 3/2000 | Klett | 156/78 |
| 6,093,245 | A | 7/2000 | Hammond et al. | 117/200 |
| 6,099,792 | A | 8/2000 | Ganguli et al. | 264/621 |
| 6,103,149 | A | 8/2000 | Stankiewicz | 264/29.1 |
| 6,183,854 | B1 | 2/2001 | Stiller et al. | 428/312.2 |
| 6,217,800 | B1 | 4/2001 | Hayward | 264/29.1 |
| 6,223,449 | B1 * | 5/2001 | Johnson et al. | 34/62 |
| 6,234,242 | B1 | 5/2001 | Sehmbey et al. | 165/129 |
| 6,241,957 | B1 | 6/2001 | Stiller et al. | 423/448 |
| 6,323,160 | B1 | 11/2001 | Murdie et al. | 508/109 |
| 6,344,159 | B1 | 2/2002 | Klett | 264/29.7 |
| 6,346,226 | B1 | 2/2002 | Stiller et al. | 423/448 |
| 6,387,343 | B1 | 5/2002 | Klett | 423/448 |
| 6,399,149 | B1 | 6/2002 | Klett et al. | 427/230 |
| 6,506,354 | B1 | 1/2003 | Stiller et al. | 423/445 |
| 6,544,491 | B1 * | 4/2003 | Stiller et al. | 423/448 |
| 6,576,168 | B2 | 6/2003 | Hardcastle et al. | 264/29.1 |
| 6,656,238 | B1 | 12/2003 | Rogers et al. | 44/620 |
| 6,662,802 | B2 | 12/2003 | Smith et al. | 128/203.16 |
| 6,726,666 | B2 | 4/2004 | de Juan, Jr. | 604/294 |
| 6,776,936 | B2 | 8/2004 | Hardcastle et al. | 264/29.1 |
| 6,849,098 | B1 | 2/2005 | Joseph et al. | 44/620 |
| 7,147,214 | B2 * | 12/2006 | Klett et al. | 261/108 |
| 7,316,262 | B1 * | 1/2008 | Rini et al. | 165/10 |
| 7,431,570 | B2 * | 10/2008 | Young et al. | 417/208 |
| 2002/0190414 | A1 | 12/2002 | Hardcastle et al. | |
| 2006/0014908 | A1 | 1/2006 | Rotermund et al. | |
| 2006/0086043 | A1 | 4/2006 | Miller et al. | |
| 2007/0110985 | A1 * | 5/2007 | Miller et al. | 428/304.4 |

OTHER PUBLICATIONS

GB Patent Specification 1,489,690, Application No. 28255/75, filed Jul. 4, 1975 titled "Briquetting Coal".
"A Novel Carbon Fiber Based Porous Carbon Monolith" by T.D. Burchell, J.W. Klett, and C.E. Weaver, Proceedings of the Ninth Annual Conference on Fossil Energy Materials, Oak Ridge, TN, May 16-18, 1995.
Kirk-Othmer, Encyclopedia of Chemical Technology, 4$^{th}$ ed., vol. 6, John Wiley & Sons, Application of Coal Petrology and Petrography, pp. 429-434 and 454-455, 1993.
University of West Virginia, Low Graphitization Insulating Foams.
Touchstone Patents—Low Graphitization Insulating Foams.
Ultramet—Low Graphitization Insulating Foams.
Touchstone Research Laboratory, Ltd., Product Data Sheet: CFOAM Carbon Foams, Rev8-0803.
ORNL High Thermal Conductivity Graphite Foams.
Carbon Graphite Foams at MER Corporation.
POCO Graphite Foam, Properties and Characteristics, Jun. 29, 2001.
High-Performance Composites, Sep. 2004, p. 25.
Modifications of Phenolic Precursor Carbon Foam, R.A. Mercuri and J.M. Criscione, Fuel Division of American Chemical Society, 156th Annual Meeting, Proceedings of 9th Carbon Conference, Jun. 16-20, 1969, pp. 206 and 207.
Preparation and Graphitization of High-Performance Carbon Foams From Coal, Rogers, et al., Touchstone Research Laboratory, Ltd.
Low-Cost Carbon Foams for Thermal Protection and Reinforcement Applications, Rogers, et al., Touchstone Research Laboratory, pp. 293-305.
Coal-Based Carbon Foam for High Temperature Applications, Dwayne R. Morgan, Touchstone Research Laboratory, Inc.
Precursor Effects on Graphite Foams, Cooling Power Electronics Using Graphite Foams, ORNL Carbon and Graphite Foams.
High Thermal Conductivity, Mesophase Pitch-Derived Carbon Foam, 43rd International SAMPE Symposium, May 31-Jun. 4, 1998, pp. 745, 746.
Microcellular Pitch-Based Carbon Foams Blown with Helium Gas, Anderson, et al., 43rd International SAMPE Symposium, May 31-Jun. 4, 1998, pp. 756, 758, and 760.
High Thermal Conductivity Graphite Foam—Progress and Opportunities, Wiechmann, et al., Composite Optics, Inc.
Performance of Alternate Precursors for Graphite Foam, James Klett and Claudia Walls, Oak Ridge National Laboratory.
Japanese article Structural and thermal characteristics of highly graphitizable AR-Foam by Fumitaka Watanabe and Isao Mochida.
GB-263—Advanced Structural Carbons: Fibers, Foams and Composites, pp. 43-51.
Characterization Requirements for Aerospace Thermal Management Applications, Brow, et al.
Aztex X-Cor, High Performance, Damage Tolerant Composite Core Material, Oct. 2002.
Polyurethane-infiltrated carbon foams: A coupling of thermal and mechanical properties, 2003, vol. 87, pp. 2348-2355, Journal of Applied Polymer Science, Timothy J. Bunning, et al. (Abstract only).
Chemistry and Physics of Carbon, vol. 1, 1965, Marcel Dekker, Inc., New York, pp. 327-365.
Chemistry and Physics of Carbon, vol. 4, 1968, Marcel Dekker, Inc., New York, pp. 286-383.
Chemistry and Physics of Carbon, vol. 7, 1971, Marcel Dekker, Inc., New York, pp. 82-105.

* cited by examiner

CARBON FOAM EVAPORATOR

BACKGROUND OF THE INVENTION

1. Technical Field

The present invention relates generally to foam evaporators useful for applications including the concentration of liquids. More particularly, the present invention relates to a carbon foam evaporator where the carbon foam has a bimodal pore distribution. The carbon foam evaporator exhibits improved thermal and chemical stability, high strength and low density. The invention also includes a method of use for the carbon foam evaporator.

2. Background Art

Evaporators in general are very widely used in industry for the concentration of liquids. Besides the concentration of liquids, foam evaporators serve to add volatile components to gas streams, and as an important part of many thermal conduction devices. For example, Weinrich in U.S. Pat. No. 6,755,396 describes a portable vehicle humidifier which uses a foam evaporator. A fan is mounted on top of a container with a foam pad located within the container. The foam pad is kept wet and the fan blows air across the pad and out through escape hatches. The escaping air is higher in humidity than the ambient air, so this is used to humidify mobile sources, such as the cab of a truck.

Additionally, Smith, et al., U.S. Pat. No. 6,662,802, describes a foam evaporator used to keep breathing lines free of condensation. A foam pad is placed around a heater and positioned at a low point in a breathing line. Condensation collects on the walls of the breathing line and flows down to the location of the foam evaporator. The foam evaporator then adsorbs and evaporates the condensation, keeping the breathing line free of liquids.

Further, de Juan, Jr. (U.S. Pat. No. 6,726,666) describes a foam evaporator used to humidify a gas stream used in eye surgery. During certain surgeries, the inside of an eye has to be filled with a gas. A moistened foam pad is placed within a container in the gas line which is directed to the interior of the patient's eye. This results in a humidified gas entering the patient's eye, which is useful in preventing clouding of the patient's cornea.

A two-phase thermosyphon is described by Sehmbey, et al. in U.S. Pat. No. 6,234,242. This thermosyphon includes a housing with a foam and a two-phase liquid inside the housing. Several slots are located within the foam to facilitate vapor flow. A liquid portion of the two-phase material is evaporated within the foam at the bottom of the housing and carried to the top of the housing, where it re-condenses. This transfers the heat needed to vaporize the liquid from the bottom of the housing to the top of the housing, which is beneficial in controlling the temperature of certain devices.

Alario, et al., in U.S. Pat. No. 5,303,768, describe a capillary pump evaporator. This capillary pump evaporator includes a foam evaporator with slots or grooves where a liquid is vaporized and carried away from the evaporator. This gas is then carried to a condenser where it condenses and is re-liquefied. The liquid then flows back to the foam evaporator. Heat is transferred from the foam evaporator to the condenser, which helps to control temperatures for certain devices.

SUMMARY OF THE INVENTION

The present invention provides a carbon foam evaporator where the carbon foam used provides unique and desirable characteristics for the evaporator. The carbon foam has a bi-modal pore distribution, and the foam is intermediate between a closed cell and an open cell foam. The carbon foam is also very chemically and thermally stable. Other characteristics of the foam include structural strength and chemical inertness. The foam can also be wet by certain polar and non-polar solvents. All of these characteristics provide for a wide use of applications involving many different liquids, gases, and operating conditions.

More particularly, the carbon foam has a density of about 0.05 to about 0.4 grams per cubic centimeter (g/cc), with a compressive strength of at least about 100 pounds per square inch (psi)(measured by, for instance ASTM C695). The pores should be relatively isotropic, by which is meant that the pores are relatively spherical. The foam should have a total porosity of at least about 65%, and can be up to about 95% and even as high as about 98% porosity, and should be thermally stable beyond at least 300 degrees centigrade (° C.).

Furthermore, the foam should have a bi-modal pore distribution which is a combination of two different average size pores. The primary fraction should be the larger size pores and the minor fraction should be the smaller size pores. Preferably at least about 90% of the pore volume should be the larger size fraction and at least about 1% of the pore volume should be the smaller size fraction. By controlling the nature of the pore distribution, the liquid permeability of the carbon foam can be controlled. Liquid permeability can be measured by, for instance, ASTM C577.

To produce the carbon foam, a polymeric foam block, particularly a phenolic foam block, is carbonized in an inert or air excluded atmosphere, at temperatures which can range from about 500° C., more preferably at least about 800° C., up to about 3,200° C.

An object of the invention, therefore, is a carbon foam evaporator wherein the carbon foam has a bi-modal pore distribution. By controlling the nature of the pore size and distribution, the permeability of the carbon foam can be controlled.

Another object of the invention is a foam evaporator with a very chemically and thermally stable carbon foam.

Another object of the invention is a foam evaporator with a carbon foam that is very strong, but has a low density, so that a high strength to density ratio exists.

Still another object of the invention is a foam evaporator with a carbon foam which is compatible with both polar and non-polar solvents.

Another object of the invention is to provide a method of use of the carbon foam evaporator.

These aspects and others that will become apparent to the artisan upon review of the following description can be accomplished by providing a carbon foam evaporator with a carbon foam having a bi-modal pore distribution, where at least about 90% of the pores by volume have a diameter of between about 10 and 150 microns or more, preferably with a diameter between about 15 and about 95 microns. At least about 0.5% of the pores by volume have a diameter of between about 0.8 microns and about 3.5 microns, or more preferably at least about 2% of the pores by volume have a diameter of between about 1 and about 2 microns. The carbon foam should have a density from about 0.05 to about 0.4 g/cc and a compressive strength of at least about 100 psi, with a porosity of between about 65% and about 98%. The pores of the carbon foam should have on average an aspect ratio of between about 1.0 and about 5.0. The carbon foam should be thermally stable at least to a temperature of 300° C.

It is to be understood that both the foregoing general description and the following detailed description provide embodiments of the invention and are intended to provide an overview or framework of understanding to the nature and character of the invention as it is claimed.

DETAILED DESCRIPTION OF THE PREFERRED EMBODIMENTS

Carbon foam evaporators in accordance with the present invention are used to vaporize or evaporate liquids. Foams have a large internal surface area, so when both a liquid and a gas permeate a foam, there is a high degree of intimate contact between the liquid and the gas. This assists in the evaporation of the liquid by providing extensive surface area for the gas-liquid contact.

Foam evaporators have many uses, including the evaporation of a more volatile liquid component out of a liquid mixture, so that the remaining liquid is concentrated. Other uses include the vaporization of a liquid into a gas stream, so the gas includes at least some of the vaporized liquid. Often times, this is humidification, where the gas is air and the liquid is water, but other examples exist, such as the evaporation of scented oils to provide a pleasant smell. Foam evaporators can also be used in heat transfer operations by the vaporization of a liquid in one location and the re-condensation of that liquid in another location, so that the heat of vaporization is transferred from the point of vaporization to the point of condensation.

Figure 1:
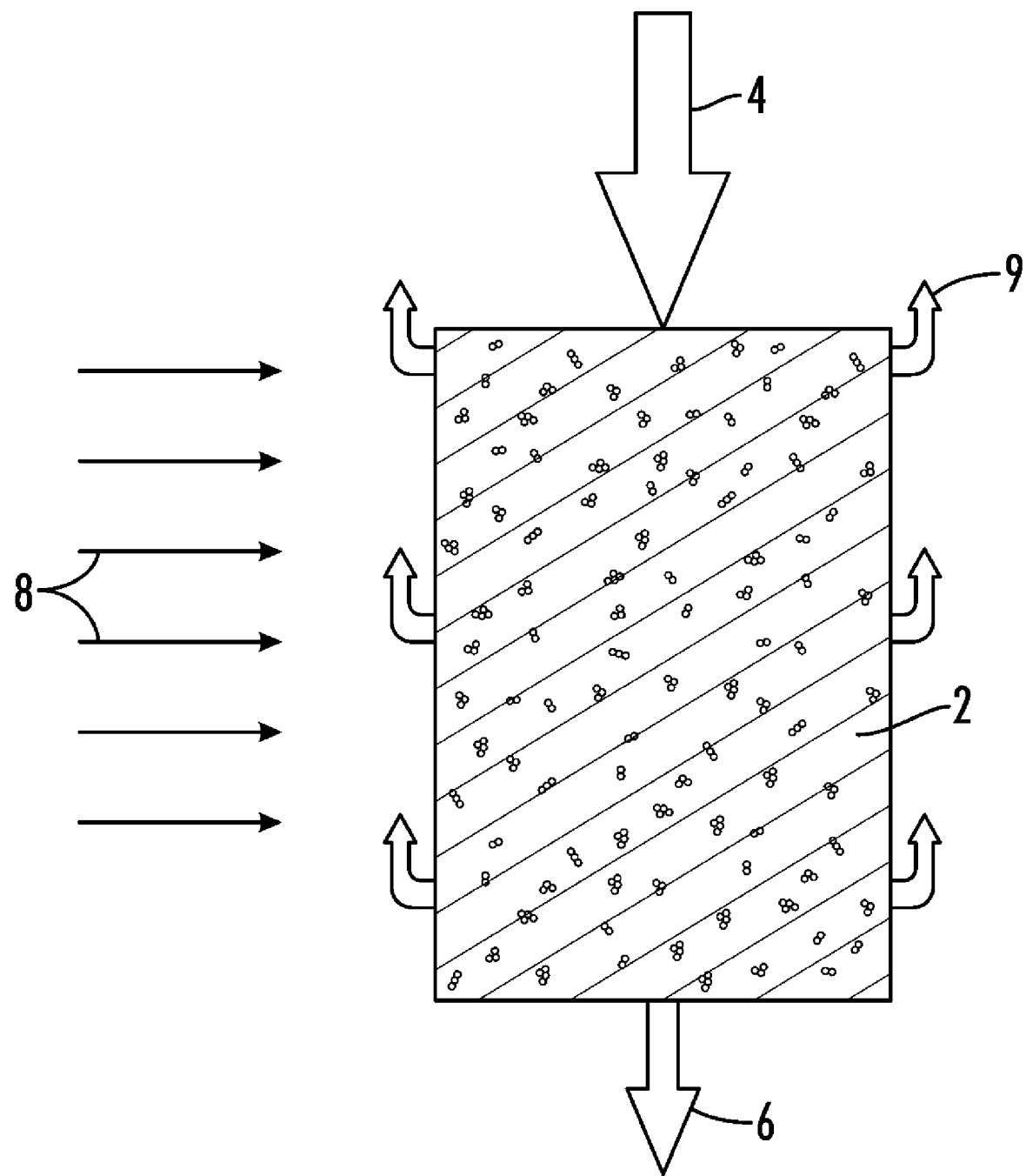
FIG. 1 is a side sectioned view of a carbon foam evaporator.

Many designs for carbon foam evaporators are possible, but some basic, common elements are depicted in FIG. 1. There has to be a carbon foam body 2, and the liquid to be evaporated has to be directed to the carbon foam body 2 by a liquid introducer 4. If less than all of the liquid is evaporated, some will exit the carbon foam body 2, and has to be collected by a liquid collector 6. FIG. 1 indicates less liquid is collected than introduced to the carbon foam body 2, because some of the liquid has been evaporated. For a gas to evaporate the liquid, the gas has to be provided to the carbon foam body 2 by a gas provider 8. The gas and evaporated liquid will find a way to exit the carbon foam body 2, by way of a gas exit 9.

Figure 2:
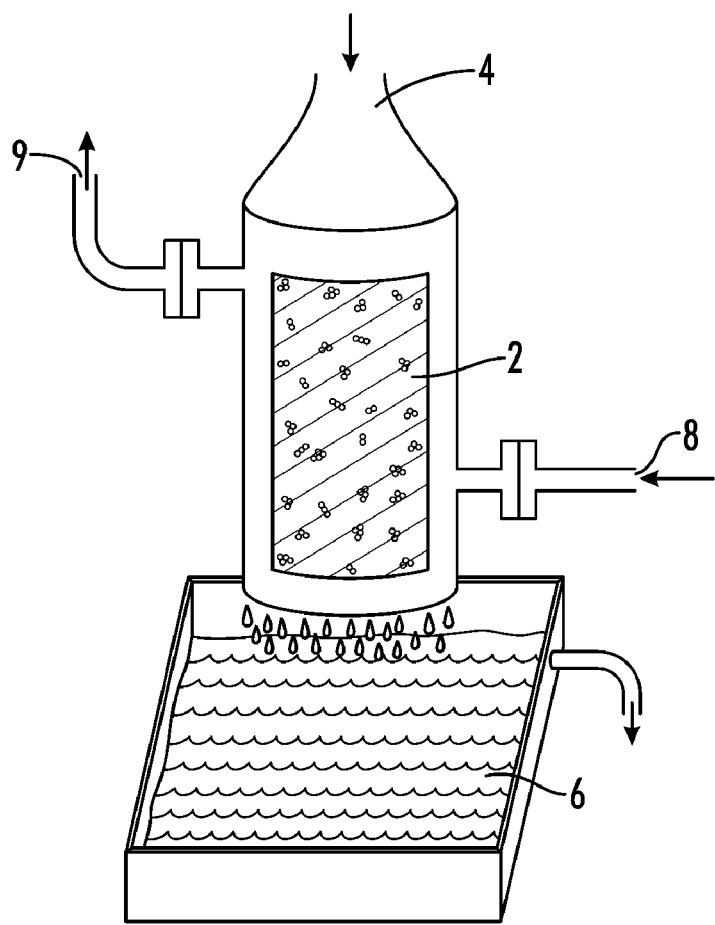
FIG. 2 is a perspective sectioned view of a carbon foam evaporator.

A more specific design is shown in FIG. 2. In this embodiment, the evaporator has a carbon foam body 2, a liquid introducer 4 on the top of the carbon foam body 2, and a liquid collector 6 underneath the foam. A gas provider 8 injects gas near the bottom of the carbon foam body 2 on the side, and the gas and evaporated liquid exit the carbon foam body 2 on the side near the top, at the gas exit 9. The gas provider 8 is also referred to as a gas access 8. A foam body 2, liquid introducer 4, liquid collector 6, and a gas provider 8 are present in one form or another in nearly all foam evaporators.

The liquid introducer 4 typically uses a pipe, conduit, or some similar structure for transferring the liquid to the carbon foam body 2. Any structure which is arranged to direct a liquid to the carbon foam body 2 can be used. The collector 6 can comprise several forms, including: a container placed below the carbon foam body 2; a pipe or conduit opening to the carbon foam body 2; or some combination wherein a container or collection basin directs the collected liquid to a pipe, conduit, tank, or other structure. Any liquid collection structure which is arranged to collect the liquids exiting, or coming from, the carbon foam body 2 can be used.

It is possible for the gas from the gas provider 8 to enter the carbon foam body 2 at almost any point, and then to exit at almost any other point, as long as the gas provider 8 is operably associated with the carbon foam body 2. The gas can be provided to one side of the carbon foam body 2 and exit another side as shown in FIG. 2, but it could just as easily be introduced from the bottom and exit from the top. In fact, the gas could enter or exit from the same locations as the liquid introduction or the liquid collection. If the gas exit 9 is from a point low on the carbon foam body 2, liquids could become entrained in the gas, which is a design consideration. The gas from the gas provider 8 can be forced to the carbon foam body 2 by the use of fans, blowers, or any form of a pressure differential across the carbon foam that will induce flow.

Alternatively, the carbon foam body 2 can be left open, so that it is not walled in. The gas provider 8 may then simply provide a gas unforced, open access to the carbon foam body 2. The gas provider 8 may be arranged to direct the gas to simply pass across the carbon foam body 2, or it may direct the gas to pass into and through the carbon foam body 2. The liquid concentrated in the carbon foam evaporator can pass through the evaporator once for a single pass or it can be recirculated for a multiple pass system. The gas used can be the atmosphere, or any other gas chosen.

To be effective, the gas cannot be saturated with the liquid component to be evaporated when contacting the carbon foam body 2. One way to avoid saturation is to use a heater so the gas propelled to or contacting the carbon foam body 2 is heated. Hot gases have a higher saturation point for a given material than cold gases, so the heated gas would evaporate more liquid. Alternatively, the heater could be placed within or around the carbon foam body 2. This would heat the gas as it contacted the carbon foam body 2, and it would heat the liquids in the carbon foam body 2 as well, which would hasten the liquid evaporation.

Figure 3:
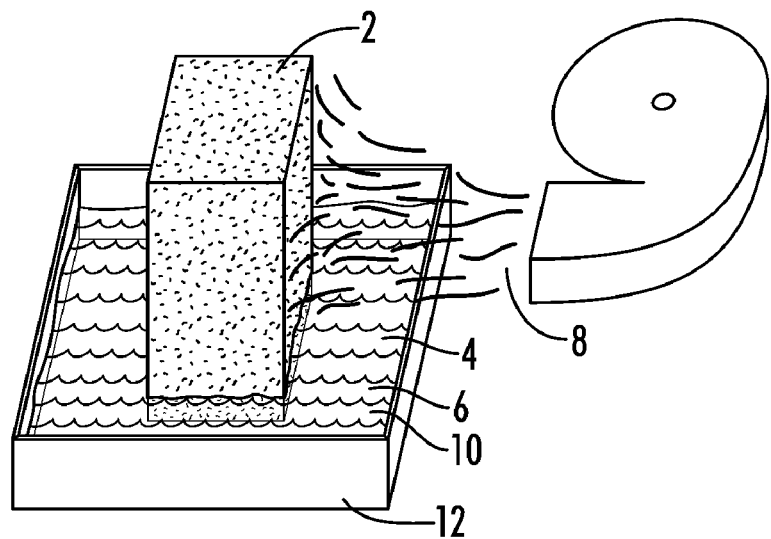
FIG. 3 is a perspective view of another embodiment of a carbon foam evaporator.

An alternate embodiment of the invention is depicted in FIG. 3. In this embodiment, both a liquid 10 and the carbon foam body 2 are disposed within a container 12. In this embodiment, the container 12 serves as both the liquid introducer 4 and the liquid collector 6. The carbon foam body 2 has two portions, wherein the first portion is below the liquid level and in contact with the liquid 10, and the second portion is above the liquid level. The liquid 10 rises up the second portion of the carbon foam body 2 by capillary action. In this embodiment, the gas access 8 provides access by a gas to the second portion of the carbon foam body 2, which is above the liquid. The gas can be forced or propelled to the second portion of carbon foam body 2, where it can be either forced into the carbon foam or just directed to blow across the foam. It is also possible to leave the carbon foam body 2 open to the gas, without forcing the gas to the carbon foam body 2, so that the gas access 8 is simply an open, unforced access of a gas to the second portion of the carbon foam body 2. The gas in this second embodiment can also be any gas, including the atmosphere.

In many cases, the desired product from an evaporator is the concentrated liquid. One example of this would be the pre-concentration of a liquid stream before a more energy intensive separation operation such as distillation was performed, thereby minimizing the overall energy use. In such cases, the liquid evaporated into the gas can be disposed of, or it can be re-condensed. Disposal could include some form of pollution control device, such as a flare or vent gas combustor.

It is also possible that the gas with the evaporated liquid in it is the desired product, such as with a humidifier.

Thermal uses are also possible. Generally, a volatile liquid is disposed in the carbon foam, which is placed on an item that needs to dissipate heat. As the item heats up, it evaporates the liquid. The heat of vaporization for most liquids is large, so significant thermal energy is transferred to the liquid to vaporize it. The foam provides a large surface area to aid in the transfer of heat to the liquid. Optimally, the vapor rises to a condenser area where it is re-condensed, and then returned to the foam evaporator. The heat of vaporization is transferred to the condenser during condensation. The condenser would be positioned where the accumulated heat is more easily dissipated.

Carbon Foam Description

The carbon foam used is prepared from polymeric foams, such as polyurethane foams or phenolic foams, with phenolic foams being preferred. Phenolic foams are a cured system with both open and closed foam cells, and are made from phenolic resins. Phenolic resins are a large family of polymers and oligomers with a wide variety of structures based on the reaction products of phenols with aldehydes. Phenolic resins are prepared by the reactions of a phenol with an aldehyde, especially formaldehyde, in the presence of an acidic or basic catalyst. The phenol reaction with formaldehyde is generally catalyzed by sodium hydroxide at a formaldehyde:phenol ratio which can vary, but is preferably about 2:1. The free phenol and formaldehyde content should be low, and urea may be used as a formaldehyde scavenger.

The polymeric foam is prepared by adjusting the water content of the resin and adding a surfactant, a blowing agent, and a catalyst to the resin. In a preferred embodiment, the surfactant is of the ethoxylated non-ionic type, the blowing agent would be pentane, methylene chloride, a chlorofluorocarbon, or any combination thereof, and the catalyst would be toluenesulfonic acid, phenolsulfonic acid, or a mixture of the two. The sulfonic acid catalyzes the reaction while the heat from the exotherm causes the blowing agent emulsified in the resin to evaporate and expand the foam. The surfactant controls the cell size as well as the ratio of open to closed cells. Both batch and continuous processes can be employed. In the continuous process, the machinery is similar to that used for continuous polyurethane foam. The properties of the foam vary primarily with the density and the cell structure of the foam.

The preferred phenol is resorcinol; however, other phenols which are able to form condensation products with aldehydes can also be used. Some examples of such phenols include, monohydric phenol, polyhydric phenols including pyrocatechol or hydroquinone, alkyl substituted phenols including cresols or xylenols, and polynuclear monohydric or polyhydric phenols including naphthols, p,p'-dihydroxydiphenyl dimethyl methane or hydroxyanthracenes.

The phenols used to make the foam starting material can also be used in admixture with added non-phenolic compounds which are able to react with aldehydes in the same way as phenol. These non-phenolic compounds include many amines such as urea and melamine.

The preferred aldehyde for use in the solution is formaldehyde. Other suitable aldehydes include those which will react with phenols in the same manner. These include, for example, acetaldehyde and benzaldehyde.

In general, the phenols and aldehydes which can be used to make the carbon foam are those described in U.S. Pat. Nos. 3,960,761 and 5,047,225, the disclosures of which are incorporated herein by reference.

The polymeric foam used as the starting material in the production of the carbon foam should have an initial density which mirrors the desired final density for the carbon foam which is to be formed. In other words, the polymeric foam should have a density of about 0.05 g/cc to about 0.4 g/cc. The polymeric foam cell structure will be partially closed and partially open. The degree of openness of the cell structure should vary depending on the properties desired in the final carbon foam. The polymeric foam should have a porosity of between about 65% and about 98% and a compressive strength on the order of about 100 psi and up to about 300 psi or higher. The compressive strength can be measured by ASTM C695.

The polymeric foam is carbonized, or converted to carbon foam, by heating in an air-excluded or inert atmosphere, such as nitrogen. The foam should be heated to a temperature from at least about 500° C., more preferably at least about 800° C. up to about 3,200° C. Since the foam can shrink by over 50% during carbonization, the heating rate should be controlled so that the polymer foam is brought to the desired temperature over a period of several days. Care should be taken to ensure uniform heating of the polymer foam for effective carbonization.

The carbon foam has a total porosity of about 65% to about 98%. The foam also has a multiplicity of pores and a bimodal pore distribution, where a fraction of smaller pores are dispersed throughout the fraction of larger pores that comprise most of the foam. At least about 90% of the pores by volume are between about 10 to about 150 microns in diameter, or more preferably between about 15 to about 95 microns in diameter. Also, a measurable percentage of the pores by volume (generally at least about 0.5%, more commonly at least about 1%) have a diameter between about 0.8 to about 3.5 microns, or more preferably between about 1 to about 2 microns. Advantageously, no more than about 5% of the pores, more advantageously no more than about 2% of the pores, are of the smaller pore diameter fraction of between about 0.8 microns and about 3.5 microns. The larger pores can be primarily connected by the smaller pores, although the larger pores can also be connected directly to each other. The bi-modal nature of the inventive foam provides an intermediate structure between open celled foams and closed cell foams.

After the carbon foam is produced it can be activated. This is done by treating it with steam, oxygen, ozone, or more preferably with carbon dioxide, at temperatures from about 700° C. to about 1,200° C. This activation expands and opens up the pores, providing larger pores and a more open celled foam. The carbon foam can be activated to varying degrees, so there is some control over how much the pore size is increased, and correspondingly how much the foam is converted to a more open celled foam.

The carbon foam has a relatively uniform distribution of isotropic pores having on average an aspect ratio preferably between about 1.0 and about 1.5. The aspect ratio is determined by dividing the longer dimension of any pore with its shorter dimension, so an aspect ratio of 1.0 represents a perfect sphere. Therefore, the pores of the carbon foam are relatively spherical and therefore isotropic. Typically, characteristics such as porosity and individual pore size and shape are measured optically, such as by use of an epoxy microscope mount using bright field illumination. The measured characteristics are determined using commercially available software, such as Image-pro software, available from Media Cybernetic of Silver Springs, Md.

The liquid permeability of the foam can be controlled through the foaming process itself, or by activation of the carbonized foam. In the foaming process, the surfactant, blowing agent, and other additives can be adjusted to prepare foams with primarily open cell character. A combination of surfactant and blowing agent generally controls the cell size, as well as the ratio of open to closed cells, in the polymeric foam from which the carbon foam is made. The second method is by the level of activation used on the carbon foam after it has been carbonized. The activation removes some of the material from the cell walls, causing an increase in the percentage of open cells. As the foam becomes more open celled in nature, the liquid permeability increases. The preferred permeability of the carbon foam depends on the particular application to which the foam is being put. A lower permeability would be beneficial when a gradual release of the evaporated compound is desired, and a higher permeability would aid in more rapid evaporation.

By the use of a polymeric foam heated in an inert environment, a non-graphitizing glassy carbon foam is obtained which has the approximate density of the starting polymer foam, or a density between about 0.05 g/cc and 0.4 g/cc. The carbon foam also has a compressive strength of at least about 100 psi. Thus, a carbon foam with a compressive strength to density ratio of at least about 1000 psi/(g/cc) is obtained. The foam is also rigid. The carbon foam can be used for structural support if necessary, because of its strength and rigidity. The strength and rigidity also allow for a high pressure feed with a large pressure drop across the evaporator, which can be beneficial in achieving higher flow rates through the foam.

Furthermore, the carbon foam is thermally stable beyond at least 300° C. (at least about 2000° C. in a non-oxidizing atmosphere), and is very chemically stable as well. This allows the carbon foam to be used at elevated temperatures with a wide variety of materials. By operating at elevated temperatures, liquid components that are not volatile at lower temperatures can be evaporatively removed from a solution, so that the liquid is concentrated. The liquids or gases introduced to the carbon foam evaporator can be aggressive materials, such as acids, bases, or oxidizers, and the chemical stability of the carbon foam will prevent the foam from significantly deteriorating.

The carbon foam is also very inert. This means the carbon foam can be used to evaporate compounds which might react on contact with metals or other materials used as evaporators. Also, the inertness of the carbon foam provides a gentle substrate for sensitive products. Furthermore, the described carbon foam is easily wetted by both water and toluene. Water is a very polar liquid and toluene is a non-polar liquid. Therefore, the carbon foam can be used readily with both polar and non polar solutions, or with emulsions which contain both polar and non polar liquids.

Figure 4:
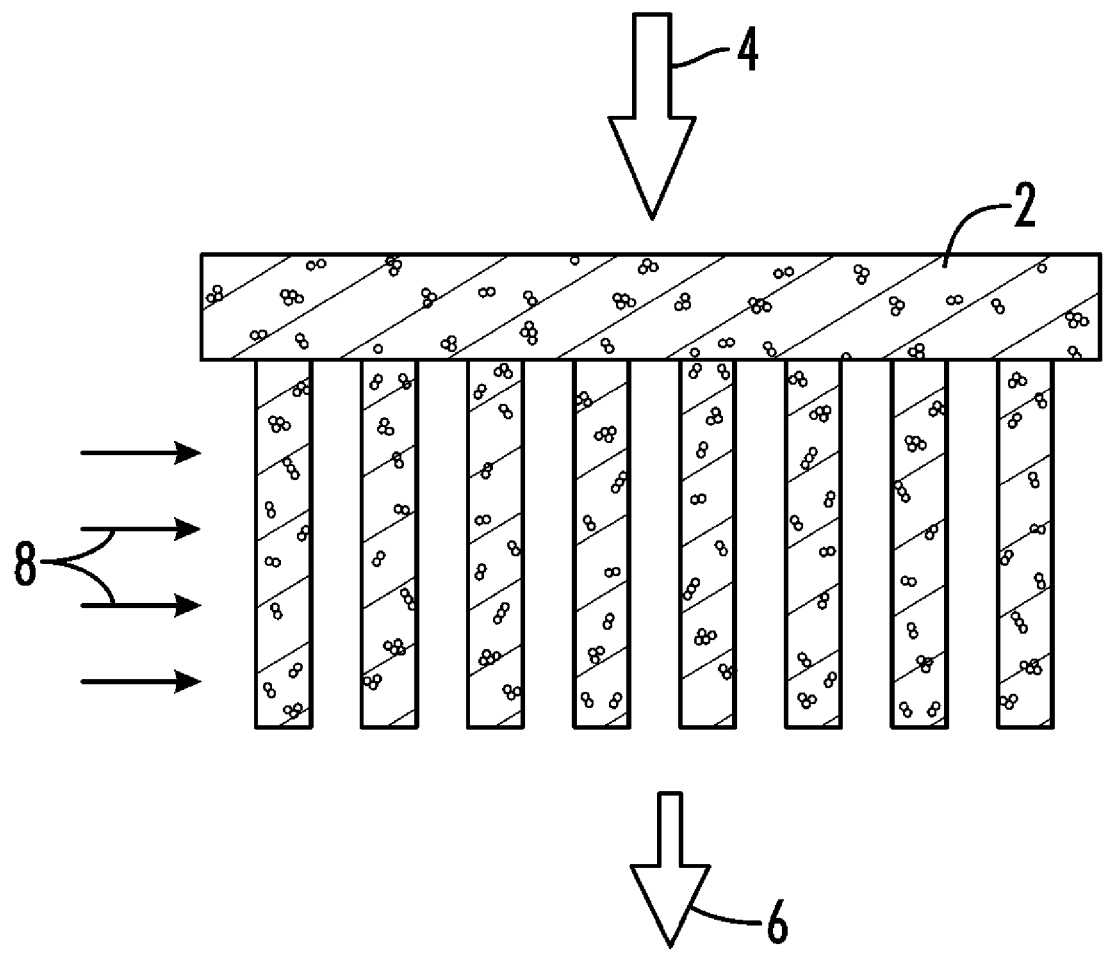
FIG. 4 is side sectioned view of a carbon foam evaporator with pillars.

The carbon foam can also be conformed to a wide variety of shapes. The original polymeric foam can be formed to a desired shape, and the resulting carbon foam shape depends on the polymeric foam's shape. After the carbon foam is created, it can be further machined to a very wide variety of final shapes. Therefore, a variety of configurations can be formed to meet the demands of the user, such as pillars of foam as depicted in FIG. 4. In this configuration, the carbon foam body 2 has many open passages between the pillars where gas from the gas provider 8 can easily and rapidly flow. The evaporation rate is enhanced because the surface area of the carbon foam/gas interface is very large. This configuration provides more rapid evaporation with a gas flow that is less restrained than if the gas were forced to pass into and through the carbon foam body 2. The liquid introducer 4 and liquid collector 6 still function as before. Almost any desired shape for the carbon foam body 2 is possible.

Because of the above listed characteristics, the carbon foam evaporator can be used for a wide variety of applications. Advantageously, the various applications could be performed using the same carbon foam evaporator, with only a good cleaning required between different uses. The many unique characteristics of the carbon foam provide a wide variety of benefits to the evaporator using this foam.

The disclosures of all cited patents and publications referred to herein are incorporated herein by reference.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. An evaporator comprising:
a carbon foam body having a multiplicity of pores and having a bimodal pore distribution wherein at least about 90% of the pores by volume have a diameter of between about 10 microns and about 150 microns and at least about 0.5% of the pores by volume have a diameter between about 0.8 microns and about 3.5 microns;
a liquid introducer arranged to direct a liquid to the carbon foam body;
a liquid collector arranged to collect liquid from the carbon foam body; and
a gas provider operably associated with the carbon foam body for providing a gas to the carbon foam body.

2. The evaporator of claim 1, wherein the gas provider forces a gas to the carbon foam body.

3. The evaporator of claim 2, wherein the gas provider is arranged to direct the gas to pass across the carbon foam body.

4. The evaporator of claim 2, wherein the gas provider is arranged to direct the gas to pass into the carbon foam body.

5. The evaporator of claim 1, wherein the gas provider comprises an unforced open atmospheric access to the carbon foam body.

6. The evaporator of claim 1 further comprising a heater, wherein the heater is arranged so that the gas contacting the carbon foam body is heated.

7. The evaporator of claim 1, wherein the carbon foam has a density of between about 0.05 g/cc to about 0.4 g/cc.

8. The evaporator of claim 7, wherein the carbon foam has a porosity of between about 65% and about 98%.

9. The evaporator of claim 1, wherein the pores have, on average, an aspect ratio of between about 1.0 and about 1.5.

10. The evaporator of claim 1, wherein at least about 90% of the pores by volume have a diameter of between about 15 microns and about 95 microns.

11. The evaporator of claim 1, wherein the carbon foam is wetted by both polar and non-polar liquids.

12. The evaporator of claim 1, wherein the carbon foam is thermally stable up to temperatures of at least three hundred degrees centigrade.

13. The evaporator of claim 1, wherein the carbon foam has a compressive strength of at least 100 psi.

14. The evaporator of claim 13, wherein the carbon foam has a compressive strength to density ratio of at least 1000 psi/(g/cc).

15. The evaporator of claim 1, wherein:
the liquid introducer and the liquid collector are comprised of a container having the liquid disposed in the container and having the carbon foam body disposed in the container with a first portion of the carbon foam body contacting the liquid and a second portion of the carbon foam body above the liquid; and
the gas provider is arranged to provide the gas access to the second portion of the carbon foam body.

16. A method of evaporating a liquid, comprising:
(a) providing a carbon foam evaporator body having a multiplicity of pores and having a bimodal pore distribution wherein at least about 90% of the pores by volume have a diameter between about 10 microns and about 150 microns, and at least about 0.5% of the pores by volume have a diameter between about 0.8 microns and about 3.5 microns;
(b) introducing the liquid into the carbon foam evaporator body;
(c) providing a gas to the carbon foam evaporator body; and
(d) evaporating at least a portion of the liquid from the carbon foam evaporator body into the gas.

17. The method of claim 16, wherein step (c) further comprises heating the gas prior to providing the gas to the carbon foam evaporator body.

18. The method of claim 16, wherein step (b) comprises placing the liquid and the carbon foam evaporator body in a container with a first portion of the carbon foam evaporator body contacting the liquid and a second portion of the carbon foam evaporator body above the liquid.

19. The method of claim 16, wherein step (c) comprises forcing the gas into contact with the carbon foam evaporator body.

20. The method of claim 16, wherein step (c) comprises providing an unforced open atmospheric access to the carbon foam evaporator body.

21. The method of claim 16, wherein said liquid comprises a liquid mixture having at least one more volatile component, and wherein the at least a portion of the liquid that is evaporated includes the more volatile component.

* * * * *